(12) United States Patent  (10) Patent No.: US 8,702,242 B2
Shirakura  (45) Date of Patent: Apr. 22, 2014

(54) PROJECTOR

(75) Inventor: Kiyomasa Shirakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 13/438,281

(22) Filed: Apr. 3, 2012

(65) Prior Publication Data

US 2012/0257172 A1  Oct. 11, 2012

(30) Foreign Application Priority Data

Apr. 7, 2011  (JP) ................................. 2011-085174
Dec. 6, 2011  (JP) ................................. 2011-266541

(51) Int. Cl.
  *G03B 21/16*  (2006.01)
(52) U.S. Cl.
  USPC ................... 353/58; 353/52; 353/57; 353/61; 353/119; 362/294; 362/373
(58) Field of Classification Search
  USPC ................... 353/52, 55, 57, 58, 61, 119, 122; 362/294, 373; 349/5, 7–9; 315/117, 315/118
  See application file for complete search history.

(56) References Cited

U.S. PATENT DOCUMENTS

| 7,926,953 | B2* | 4/2011 | Yanagisawa et al. | 353/61 |
| 8,303,118 | B2* | 11/2012 | Minami | 353/52 |
| 2008/0252858 | A1* | 10/2008 | Zheng et al. | 353/58 |
| 2008/0252859 | A1* | 10/2008 | Nagahata et al. | 353/61 |

FOREIGN PATENT DOCUMENTS

JP  2010-74671 A  4/2010

* cited by examiner

*Primary Examiner* — Sultan Chowdhury
(74) *Attorney, Agent, or Firm* — ALG Intellectual Property, LLC

(57) ABSTRACT

A projector includes a wireless device performing a predetermined function, an external housing which accommodates a light modulation device, a first controller, and the wireless device, an intake fan which introduces air outside the external housing into the external housing through an inlet port, an exhaust fan which discharges the air introduced into the external housing through the inlet port to the outside through an outlet port, a first channel which guides the air introduced through the inlet port toward the light modulation device by the drive of the intake fan, and a second channel which guides the air introduced into the external housing toward the exhaust fan via the wireless device by the drive of the exhaust fan.

4 Claims, 7 Drawing Sheets

PROJECTOR

BACKGROUND

1. Technical Field

The present invention relates to a projector.

2. Related Art

A projector is known which modulates light emitted from a light source according to image information and enlarges and projects the modulated light onto a projection surface such as a screen. The light source included in this type of projector is constituted by a discharge-type lamp such as an extra-high pressure mercury lamp, for example. The projector having this structure is provided with a cooling mechanism including a cooling fan and others so as to avoid generation of heat from components of the projector during lighting of the light source. Moreover, with the development of wireless transmission technology in recent years, a system containing a receiver which receives an image signal transmitted from an external device by wireless has been proposed (for example, see JP-A-2010-74671).

An image display system disclosed in JP-A-2010-74671 includes an image signal output device, a transmitter which transmits an image signal outputted from the image signal output device by wireless, a receiver which receives the image signal transmitted from the transmitter by wireless, and a projection type image display apparatus (liquid crystal projector) which displays an image corresponding to the image signal received by the receiver. The liquid crystal projector includes a wireless module constituting the receiver, a light source containing an extra-high pressure mercury lamp or the like, a liquid crystal panel, and a projection lens.

According to the technology disclosed in JP-A-2010-74671, however, the components of the liquid crystal projector such as the liquid crystal panel may be subject to thermal deterioration by expected generation of heat from the receiver, because the cooling capacity of the cooling mechanism provided within the liquid crystal projector for reducing heat generated from the light source is not sufficient to cool the receiver together with the light source (this problem is not touched upon in the specification of JP-A-2010-74671). For overcoming this problem, a unit for cooling the receiver may be added to the interior of the projector, in which case, however, the size of the projector increases. In addition, such a structure which efficiently cools the components (structure for supplying air to a cooling target with high efficiency by a preferable air amount and at a preferable flow speed) for size reduction is difficult to be equipped.

SUMMARY

An advantage of some aspects of the invention is to solve at least a part of the problems described above, and the invention can be implemented as the following forms or application examples.

Application Example 1

This application example of the invention is directed to a projector including: a light modulation device which modulates light emitted from a light source according to image information; a projection lens which projects the light modulated by the light modulation device; a first controller equipped to drive the light modulation device; a second controller provided separately from the first controller to perform a predetermined function; an external housing which accommodates the light modulation device, the first controller, and the second controller; a first fan which introduces air outside the external housing into the external housing through an inlet port; a second fan which discharges the air introduced into the external housing through the inlet port to the outside through an outlet port; a first channel which guides the air introduced through the inlet port toward the light modulation device by the drive of the first fan; and a second channel which guides the air introduced into the external housing toward the second fan via the second controller by the drive of the second fan.

According to this configuration, the projector has the first channel and the second channel. The first channel guides the air introduced through the inlet port toward the light modulation device by the drive of the first fan, while the second channel guides the air introduced into the external housing toward the second fan via the second controller by the drive of the second fan. The second fan discharges the air within the external housing through the outlet port. According to this arrangement, the air flowing along the first channel and the air flowing along the second channel do not interfere with each other. In this case, control over the flow amount and the flow speed of the air supplied toward the first channel and the second channel for cooling the light modulation device and the second controller becomes easier, contributing to efficient cooling for the light modulation device and the second controller. Accordingly, deterioration of a projected image, deterioration of the predetermined function of the second controller, and deterioration of the peripheral components around the light modulation device and the second controller can be reduced. Moreover, the efficient cooling thus achieved further allows reduction of the sizes of the first fan and the second fan and therefore the entire size of the projector, and also allows the use of the first fan and the second fan capable of supplying larger amounts of air so as to reduce noise generated from the projector.

Application Example 2

In the projector according to the above application example, it is preferable that the external housing of the projector of the above aspect has an opening through which light passes from the projection lens. In this case, the inlet port and the outlet port are disposed near the opening of the external housing, and the opening is interposed between the inlet port and the outlet port.

According to this configuration, the inlet port and the outlet port are formed in the external housing on the side where light is projected from the projection lens. In other words, the projector introduces air for cooling the light modulation device and the second controller from the side of the image to be projected and discharges the air toward the image. Accordingly, the projector can securely cool the light modulation device and the second controller without closure of the inlet port and the outlet port even in such an installation environment where parts and the like are disposed in the vicinity of the side of the projector different from the image side. Moreover, the air discharged from the outlet port does not reach an observer observing the projected image in the vicinity of the side of the projector different from the image side. Thus, the observer is not made uncomfortable by the discharged air during image projection.

Accordingly, the projector can achieve both reduction of deterioration of the light modulation device and the second controller, and increase in the degree of freedom for the way of installation of the projector and the position of the observer observing the image.

Application Example 3

In the projector of the above application example, it is preferable that the second controller of the projector of the above aspects is disposed within the external housing near the inlet port and away from the outlet port with the projection lens interposed between the inlet port and the outlet port. In this case, the second channel is provided in such a manner as to ride on the projection lens.

According to this configuration, the second controller is disposed within the external housing near the inlet port. In this arrangement, the second controller can be efficiently cooled by cooling air introduced through the inlet port and supplied before cooling other components. Moreover, the second channel is provided in such a manner as to ride on the projection lens. In this case, the space around the projection lens as a dead space is effectively utilized to produce the second channel in the configuration where the second fan is located near the outlet port. Accordingly, formation of the efficient cooling structure for the second controller and size reduction of the projector can be both achieved.

Application Example 4

In the projector of the above application example, it is preferable that the second controller of the projector of the above aspects is disposed within the external housing near the inlet port with respect to the position of the projection lens. In this case, the light source is disposed within the external housing near the outlet port with respect to the position of the projection lens.

According to this configuration, the second controller is located near the inlet port, while the light source is located near the outlet port, with the projection lens interposed between the second controller and the light source. In this arrangement, the second controller and the light source can be disposed away from each other such that the air having cooled the light source can be discharged from the outlet port without passing through the second channel. Thus, heat generated from the light source is not easily conducted to the second controller, in which condition more efficient cooling for the second controller can be achieved.

Application Example 5

In the projector of the above application example, it is preferable that at least a part of the first channel and the second channel of the projector of the above aspects is formed by a duct accommodated in the external housing.

According to this configuration, at least a part of the first channel and the second channel is formed by the duct accommodated in the external housing. In this case, the degree of freedom in shaping the channels increases. Accordingly, the space within the external housing can be effectively utilized to produce the first channel and the second channel.

Application Example 6

In the projector of the above application example, it is preferable that the second controller of the projector of the above aspects is a wireless device which can provide wireless communication. In this case, a receiver or a transmitter of the wireless device faces to the light projection side from the projection lens.

According to this configuration, the second controller is constituted by the wireless device capable of providing wireless communication. Thus, the wireless device can communicate with the outside by wireless in a stable condition while efficiently cooled by the air flowing along the second channel. Moreover, the wireless device is disposed in such a condition that its receiver or transmitter faces to the side of light projection from the projection lens. In this arrangement, the receiver or transmitter of the wireless device is disposed opposed to the projected image, that is, the projection surface such as a screen. Accordingly, the wireless device can securely communicate with an external wireless device when this external wireless device is positioned in the vicinity of the screen for communicating with the wireless device, that is, installed in such a condition that obstacles to the wireless communication can be decreased under the use environment of the projector.

BRIEF DESCRIPTION OF THE DRAWINGS

The invention will be described with reference to the accompanying drawings, wherein like numbers reference like elements.

DESCRIPTION OF EXEMPLARY EMBODIMENT

A projector according to an embodiment of the invention is hereinafter described with reference to the drawings.

The projector in this embodiment modulates light emitted from a light source according to image information, and enlarges and projects the modulated light onto a screen or the like from a projection lens. The projector in this embodiment is so constructed as to receive a wireless signal corresponding to image information transmitted from an external transmitting device, and to project an image corresponding to the wireless signal.

Main Structure of Projector

Figure 1:
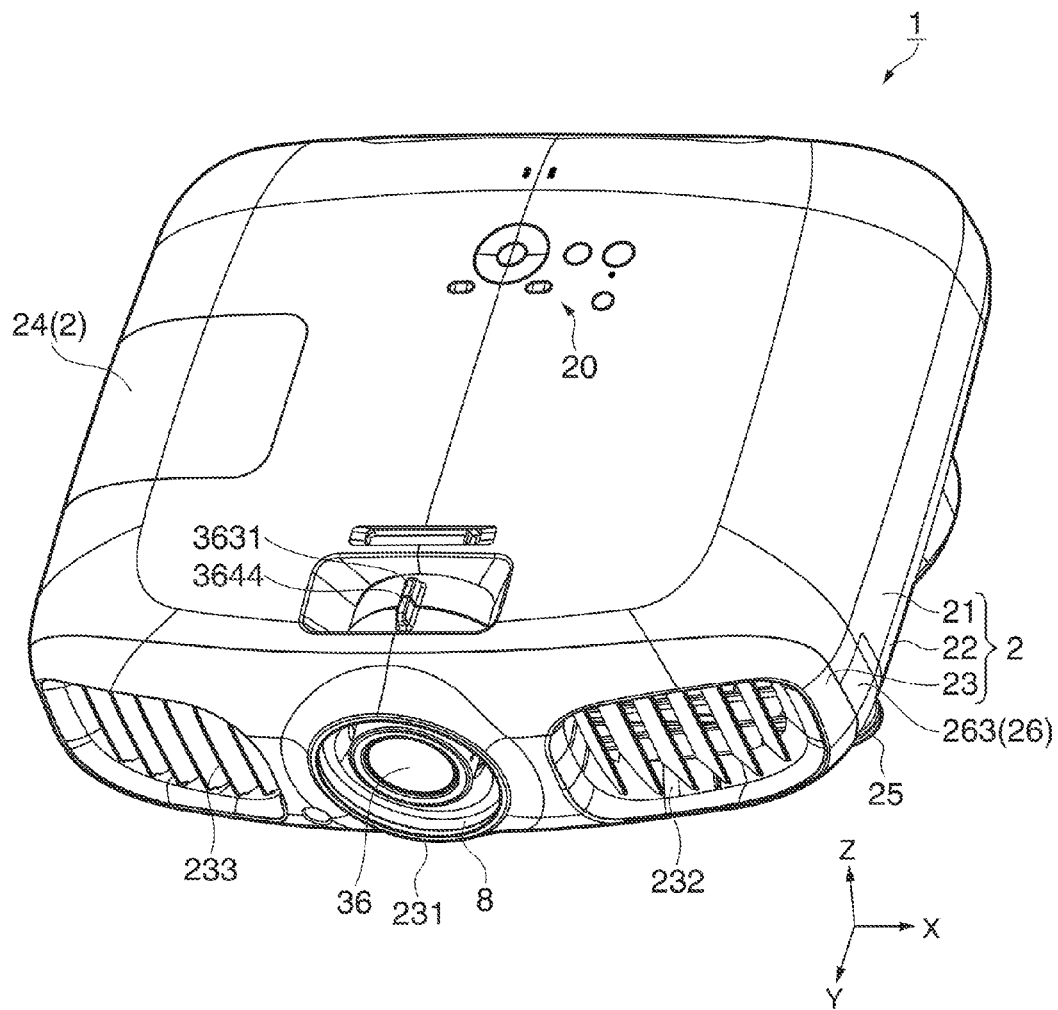
FIG. 1 is a perspective view illustrating the external appearance of a projector according to an embodiment.
Figure 2:
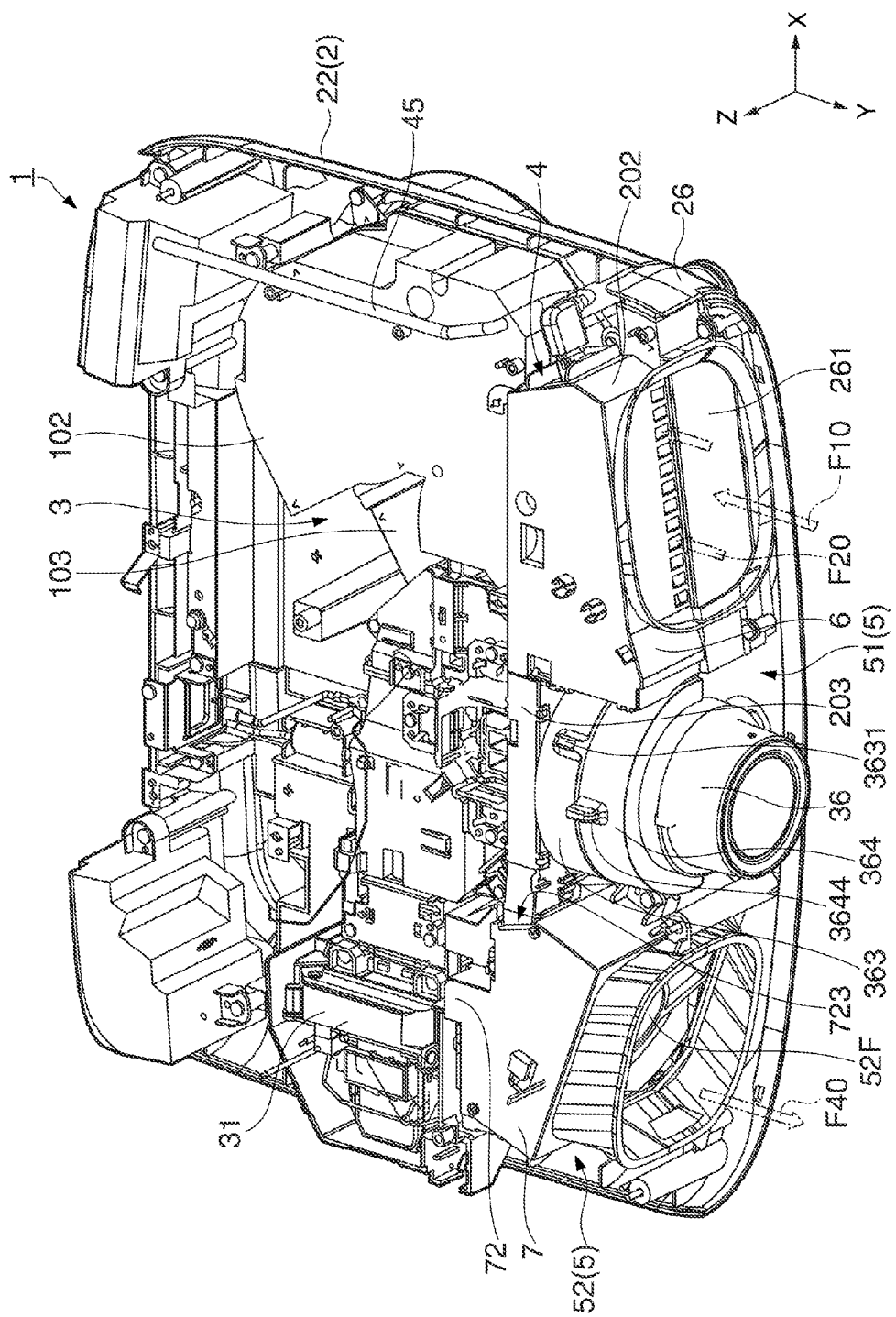
FIG. 2 is a perspective view illustrating the interior of the projector according to the embodiment.

FIG. 1 is a perspective view illustrating the external appearance of a projector 1 according to this embodiment. FIG. 2 is a perspective view illustrating the interior of the projector 1.

As illustrated in FIGS. 1 and 2, the projector 1 includes an external housing 2 constituting the external case, a dustproof filter 26, a first controller (not shown), an optical unit 3 having a substantially L shape and containing a light source device 31 and a projection lens 36, a wireless device 4 as a second controller, and a cooling device 5.

The external housing 2 further accommodates a power source device which supplies power to the light source device 31, the first controller and others, an input terminal unit, and other components, which parts are not specifically shown in the figure. The input terminal unit has connection terminals (such as HDMI (high definition multimedia interface) terminal, video terminal, and audio terminal) through which image signals, audio signals and the like received from an external device (such as computer and video player) are inputted. In the following description, the direction of light emission from the light source device 31 corresponds to the +X direction (right direction), the direction of light projection from the projection lens 36 corresponds to the +Y direction (front direction), and the upward direction in FIG. 1 corresponds to the +Z direction (upward direction) for convenience of explanation.

The external housing 2 is made of synthetic resin, and accommodates the first controller, the optical unit 3, the wireless device 4, the cooling device 5, and others. As illustrated in FIG. 1, the external housing 2 has an upper case 21, a lower case 22, a front case 23, a lamp cover 24, and others, all parts of which are fixed via screws or the like.

As illustrated in FIG. 1, the upper case 21 constitutes the upper part of the external housing 2. An operation panel 20 is provided on the rear part of the upper surface of the upper case 21 as a unit through which various commands are inputted to the projector 1. Moreover, a zoom lever 3631 and a focus lever 3644 of the projection lens 36 are provided before the operation panel 20 and exposed through the upper case 21.

The lower case 22 constitutes the lower part of the external housing 2. Feet 25 are provided on the bottom of the lower-case 22 as parts brought into contact with an installation surface of a desk or the like when the projector 1 is placed thereon.

The front case 23 constitutes the front part of the external housing 2. As illustrated in FIG. 1, an opening 231 which is circular as viewed from the front is provided at the center of the front case 23. The projection lens 36 is arranged inside the opening 231. Light traveling from the projection lens 36 passes through the opening 231 to be projected onto the screen or the like.

As illustrated in FIG. 1, an inlet port 232 is provided in the front case 23 on the +X side of the opening 231 as a port through which the outside air is introduced. The inlet port 232 has a louver shape which has plate-shaped members extending in the up-down direction and arranged side by side with clearances left between the adjoining members. The dust-proof filter 26 (details of which will be described later) is provided inside the inlet port 232.

Moreover, an outlet port 233 is provided in the front case 23 on the −X side of the opening 231 as a port through which the air heated within the external housing 2 is discharged to the outside. The outlet port 233 has a louver shape which has plate-shaped members extending in the up-down direction and arranged side by side with clearances left between the adjoining members.

According to this structure, the inlet port 232 and the outlet port 233 are formed on the side where the opening 231 of the external housing 2 is located, and the opening 231 is interposed between the inlet port 232 and the outlet port 233.

The first controller includes a circuit board and electronic components such as a control unit (not shown) mounted on the circuit board. The control unit has a CPU (central processing unit), a ROM (read only memory), a RAM (random access memory), and others to function as a computer. The first controller controls the operation of light modulation devices (described later), the driving of first and second fans (described later), and other operations of the projector 1, for example.

The optical unit 3 performs optical steps for processing light emitted from a light source 311, and projects the processed light under the control of the first controller.

Figure 3:
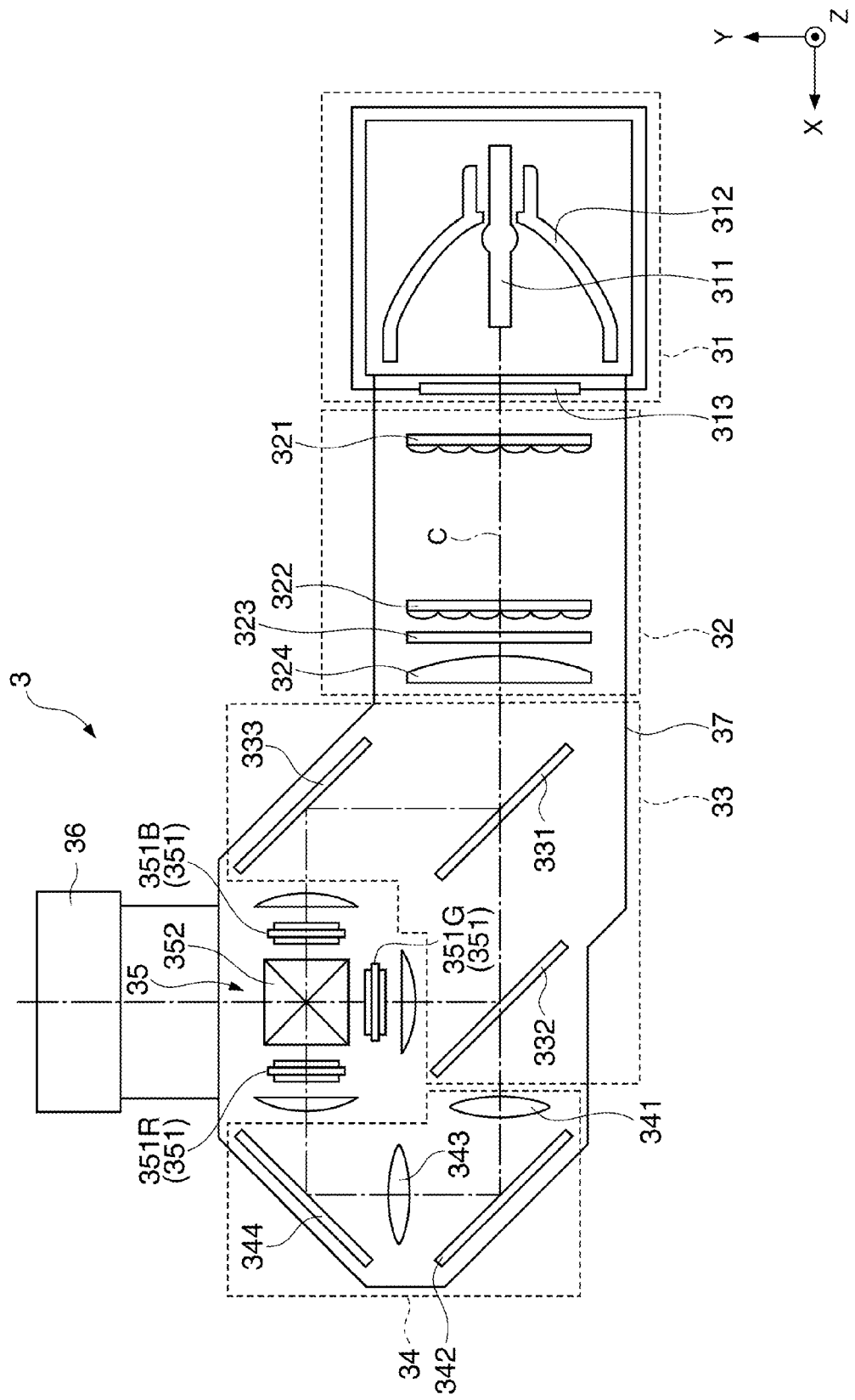
FIG. 3 schematically illustrates the general structure of an optical unit according to the embodiment.

FIG. 3 schematically illustrates the general structure of the optical unit 3. As illustrated in FIG. 3, the optical unit 3 includes the light source device 31 containing the light source 311, an integrator illumination system 32, a color separation system 33, a relay system 34, an electro-optic device 35, the projection lens 36, and an optical component housing 37 which locates these components (from the light source device 31 to the projection lens 36) at predetermined positions on the optical path.

As illustrated in FIG. 3, the optical unit 3 has a substantially L shape in the plan view. The light source device 31 is detachably attached to one end of the L shape, while the projection lens 36 is disposed at the other end. As illustrated in FIG. 2, the light source device 31 is positioned on the side closer to the outlet port 233 (see FIG. 1) with respect to the projection lens 36.

The light source device 31 has the discharge-type light source 311 constituted by an extra-high pressure mercury lamp, a metal halide lamp or others, a reflector 312, a collimating lens 313 as a light transmitting member, and other components. The light source device 31 reflects light emitted from the light source 311 by using the reflector 312, equalizes the emission direction of the reflected light by using the collimating lens 313, and supplies the equalized light toward the integrator illumination system 32.

The integrator illumination system 32 includes a first lens array 321, a second lens array 322, a polarization converting element 323, and a stacking lens 324.

The first lens array 321 is an optical element which divides light emitted from the light source device 31 into a plurality of partial lights, and has a plurality of small lenses disposed in matrix within a plane crossing an optical axis C of the light emitted from the light source device 31 substantially at right angles.

The second lens array 322 has a structure substantially similar to that of the first lens array 321, and stacks the partial lights received from the first lens array 321 onto the surfaces of liquid crystal light valves 351 (described later) in cooperation with the stacking lens 324.

The polarization converting element 323 has the function of converting the random lights received from the second lens array 322 into substantially one type of polarized lights processible by the liquid crystal light valves 351.

The color separation system 33 has two dichroic mirrors 331 and 332 and a reflection mirror 333, and has the function of separating the lights received from the integrator illumination system 32 into three color lights of red light (hereinafter referred to as "R light"), green light (hereinafter referred to as "G light"), and blue light (hereinafter referred to as "B light").

The relay system 34 includes an entrance side lens 341, a relay lens 343, and reflection mirrors 342 and 344, and has the function of guiding the R light separated by the color separation system 33 toward a liquid crystal light valve 351R for R light. The color light guided by the relay system 34 is not limited to the R light but may be the B light, for example.

The electro-optic device 35 includes the liquid crystal light valves 351 as light modulation devices, and a cross dichroic prism 352 as a color combining device. The electro-optical device 35 modulates the respective color lights separated by the color separation system 33 according to image information, and combines the modulated lights.

The liquid crystal light valves 351 are equipped for each of the three color lights (liquid crystal light valve 351R for R light, liquid crystal light valve 351G for G light, and liquid crystal light valve 351B for B light). Each of the liquid crystal light valves 351 has a transmission type liquid crystal panel and a pair of an entrance side polarization plate and an exit side polarization plate disposed on one and the other surfaces of the liquid crystal panel, respectively.

Each of the liquid crystal light valves 351 has a rectangular pixel area where not-shown small pixels are disposed in matrix. Each light transmittance of the pixels is determined in accordance with image information so that a desired display image can be formed within the pixel area. The respective color lights separated by the color separation system 33 are modulated by the corresponding liquid crystal light valves 351, and supplied to the cross dichroic prism 352.

The cross dichroic prism 352 has a substantially square shape in the plan view produced by affixing four rectangular prisms, and contains two dielectric multilayer films on the interfaces between the affixed rectangular prisms. The cross dichroic prism 352 reflects the color lights modulated by the liquid crystal light valves 351R and 351B, and transmits the color light modulated by the liquid crystal light valve 351G so as to combine the respective color lights.

The projection lens 36 has a plurality of lenses, and enlarges and projects the light modulated by the liquid crystal light valves 351 and combined by the cross dichroic prism 352 onto the screen. As illustrated in FIG. 2, the projection lens 36 has a zoom ring 363 and a focus ring 364 provided for zoom control and focus control of the projected image. The zoom ring 363 and the focus ring 364 have the zoom lever 3631 and the focus lever 3644, respectively.

The optical unit 3 is fixed to the lower case 22 by screws.

The wireless device 4 as the second controller is provided separately from the first controller to perform predetermined functions. The wireless device 4 in this embodiment receives a wireless signal corresponding to image information transmitted from an external transmitting device disposed outside the projector 1. The wireless device 4 in this embodiment is so structured as to provide WiHD (wireless high definition) system high-speed wireless communication, and connected with the HDMI terminal of the input terminal unit and the first controller. The first controller receives a signal outputted from the wireless device 4 and controls the optical unit 3 in accordance with the signal such that an image corresponding to the wireless signal can be projected. The details of the wireless device 4 will be described later.

As illustrated in FIG. 2, the cooling device 5 has an inlet unit 51 apart of which is disposed within the external housing 2 and closer to the inlet port 232 (+X side) with respect to the projection lens 36, and an outlet unit 52 disposed within the external housing 2 and closer to the outlet port 233 (−X side) with respect to the projection lens 36.

Figure 4:
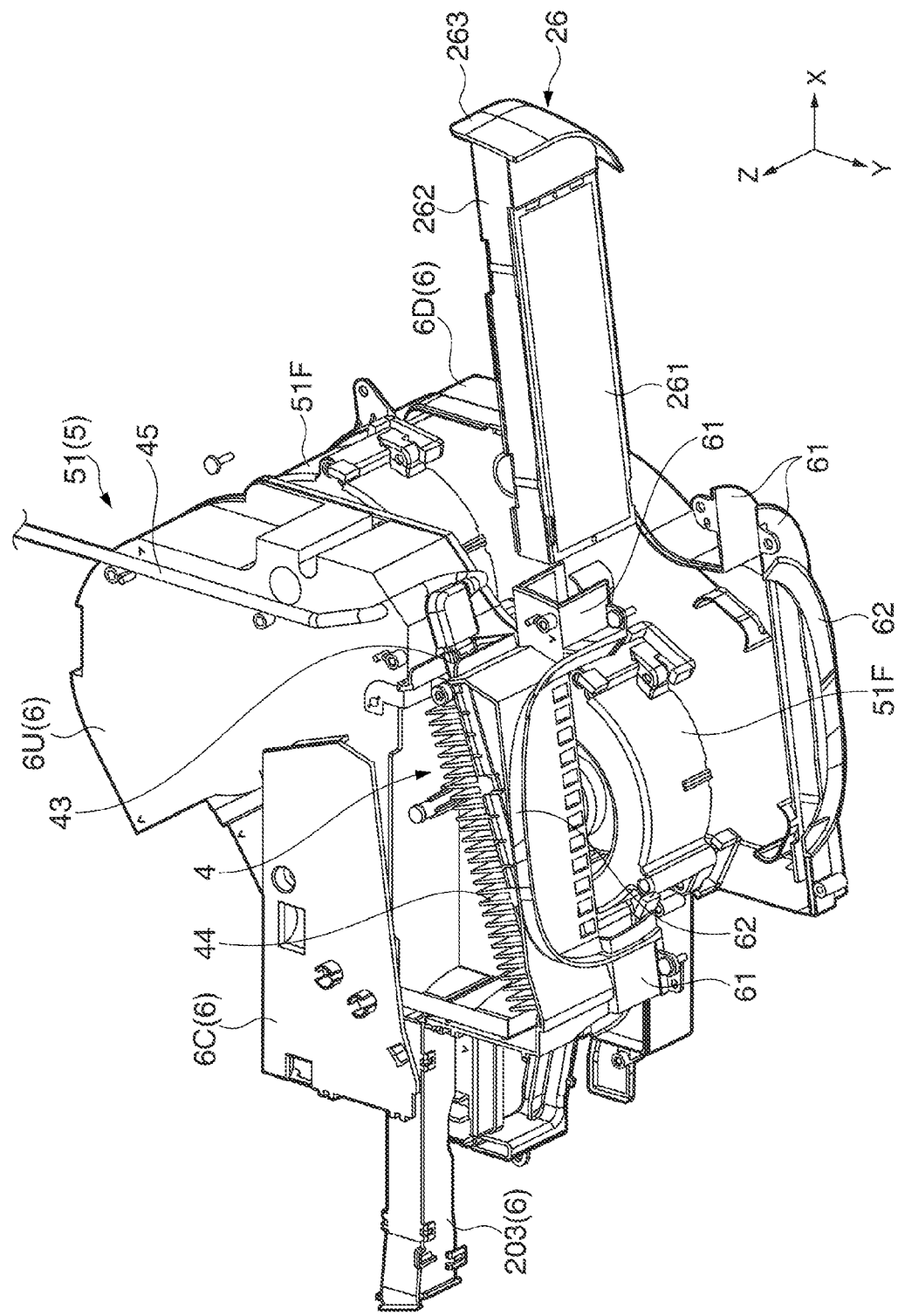
FIG. 4 is a perspective view illustrating a wireless device and an inlet unit in a disassembled condition according to the embodiment.

FIG. 4 is a perspective view illustrating the wireless device 4 and the inlet unit 51 in a disassembled condition.

As illustrated in FIG. 4, the inlet unit 51 has two intake fans 51F as the first fan, and a duct 6. The wireless device 4 is accommodated within the duct 6. More specifically, the wireless device 4 is disposed within the external housing 2 and closer to the inlet port 232 (see FIG. 1) with respect to the projection lens 36 at a position away from the light source device 31 disposed closer to the outlet port 233 (see FIG. 1) with respect to the projection lens 36.

As illustrated in FIG. 2, the outlet unit 52 has an exhaust fan 52F as the second fan.

The cooling device 5 is so constructed as to cool the optical unit 3, the wireless device 4 and others by introducing air from the outside through the inlet port 232 of the external housing 2 and allowing the air to flow inside, and to discharge the heated air after cooling through the outlet port 233. The details of the cooling device 5 will be described later.

Structure of Wireless Device

The details of the wireless device 4 are now explained.

Figure 5A:
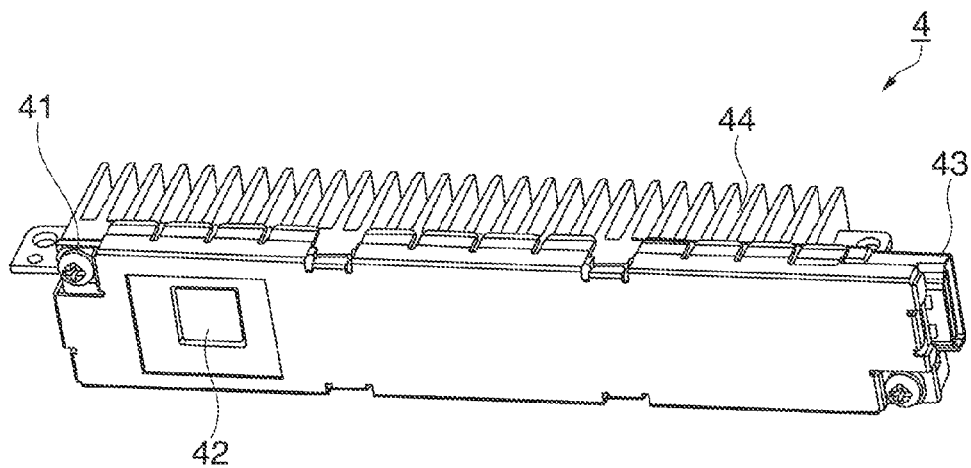
FIGS. 5A and 5B are perspective views of the wireless device according to the embodiment.
Figure 5B:
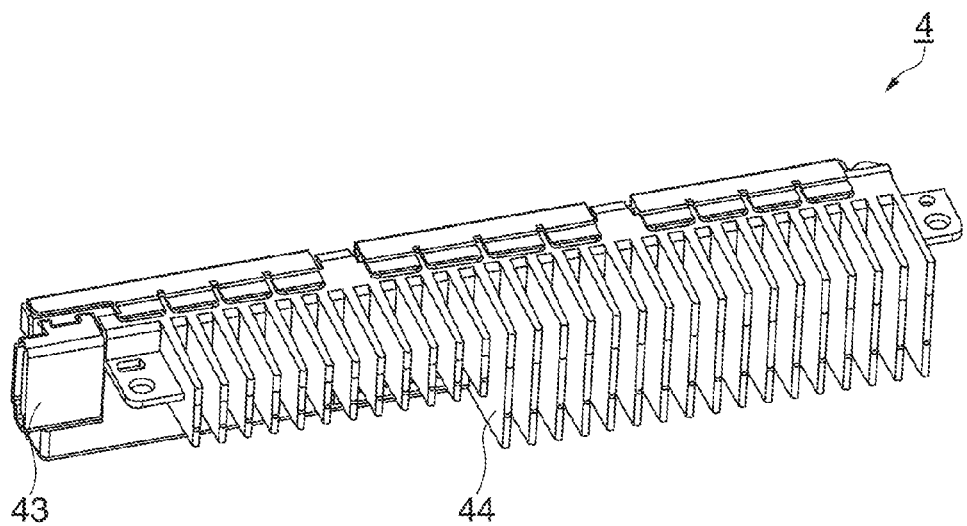

FIGS. 5A and 5B are perspective views of the wireless device 4. FIG. 5A shows the wireless device 4 as diagonally viewed from the front, while FIG. 5B shows the wireless device 4 as diagonally viewed from the rear.

As illustrated in FIGS. 5A and 5B, the wireless device 4 includes a circuit board 41 having a rectangular shape in the plan view, a receiver 42 which receives a wireless signal, a circuit element (not shown) which processes the received signal, a connection terminal 43, a control connection portion (not shown) connected with the first controller, and a heat sink 44.

The receiver 42 is mounted on the circuit board 41 in the vicinity of one end of the circuit board 41 in the direction of its length, while the connection terminal 43 is mounted on the circuit board 41 in the vicinity of the other end of the circuit board 41 in the direction of its length.

The heat sink 44 is attached to the circuit board 41 on the side opposite to the side where the receiver 42 is mounted. The heat sink 44 has a base having the same size as that of the circuit board 41 in the plan view, and a plurality of plate-shaped ribs projecting from the base. The plural ribs extend in the direction along the shorter sides of the rectangular shape of the circuit board 41.

As illustrated in FIG. 4, the wireless device 4 is arranged such that the receiver 42 (see FIG. 5A) faces to the front and that the connection terminal 43 is located on the +X side. The wireless device 4 is disposed inclined to the X-Z plane such that the +X side (connection terminal 43 side) of the wireless device 4 is positioned on the rear side (−Y direction side) with respect to the −X side of the wireless device 4, and disposed such that the ribs of the heat sink 44 extend in the up-down direction. This inclination of the wireless device 4 contributes to reduction of the size of the projector 1 in the left-right direction.

The connection terminal 43 of the wireless device 4 is connected with the HDMI terminal (not shown) of the input terminal unit via an HDMI cable 45, while the control connection portion (not shown) is connected with the first controller via a not-shown cable.

Structure of Cooling Device

The details of the cooling device 5 are now explained.

The cooling device 5 which includes the inlet unit 51 and the outlet unit 52 as noted above is attached to the lower case 22.

Structure of Inlet Unit

Initially, the inlet unit 51 is discussed. The inlet unit 51 has the two intake fans 51F and the duct 6 as noted above. Each of the intake fans 51F is constituted by a sirocco fan.

Figure 6:
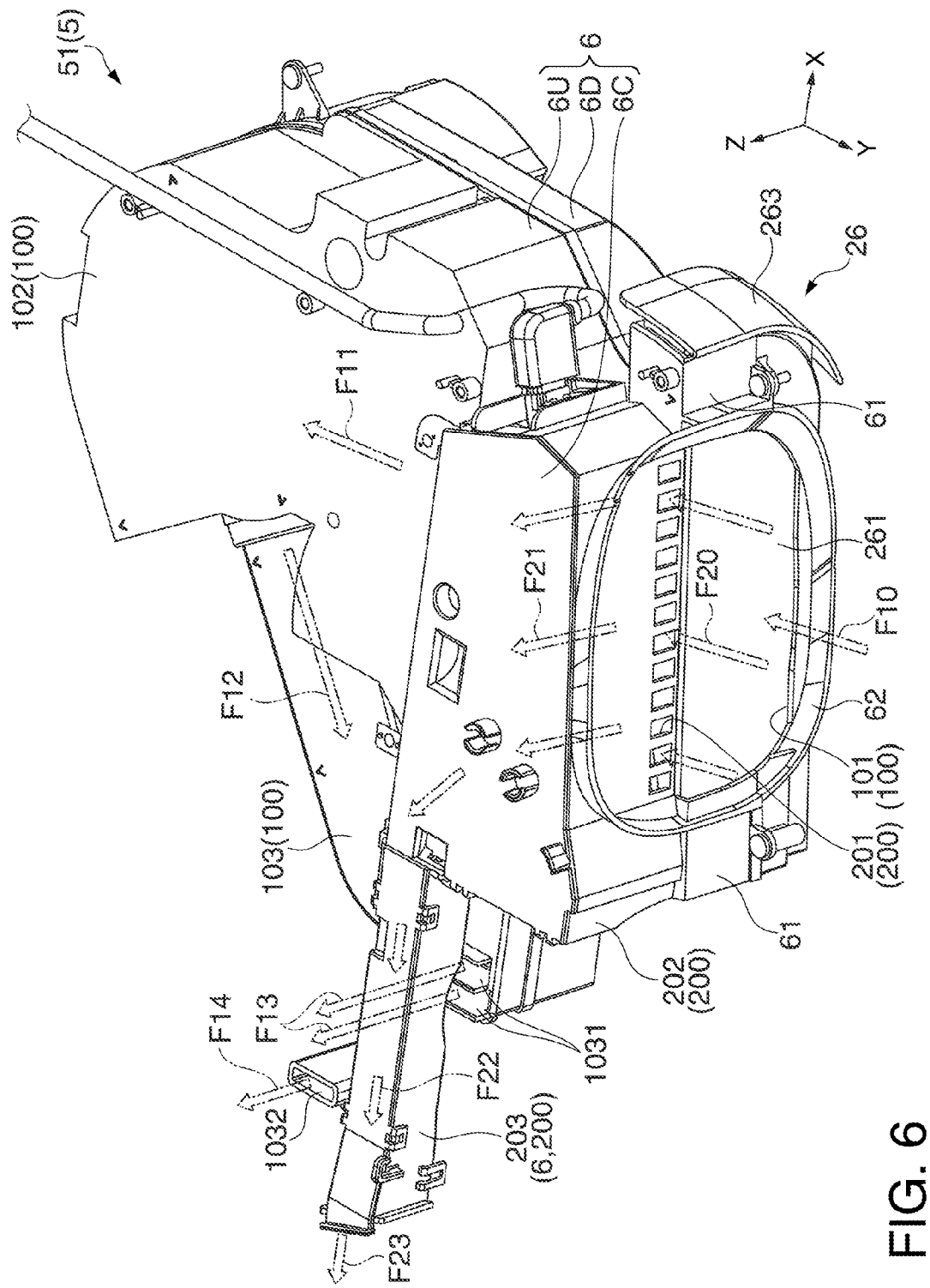
FIG. 6 is a perspective view of the inlet unit according to the embodiment.

FIG. 6 is a perspective view of the inlet unit 51.

As illustrated in FIGS. 4 and 6, the duct 6 has an upper frame 6U, a lower frame 6D, a lens channel 203, and a cover 6C. These components 6U, 6D, 203 and 6C, when combined, form two channels within the duct 6. More specifically, the duct 6 contains a first channel 100 along which air introduced from the inlet port 232 is guided toward the electro-optic device 35 and the polarization converting element 323 by the drive of the intake fans 51F, and a second channel 200 along which air introduced from the inlet port 232 is guided via the wireless device 4 toward the exhaust fan 52F by the drive of the exhaust fan 52F.

Structure of First Channel

As illustrated in FIG. 6, the first channel 100 is defined by a fan storage portion 102 and an outlet portion 103 of the duct 6.

As illustrated in FIGS. 4 and 6, the fan storage portion 102 has a box shape produced by the upper frame 6U and the lower frame 6D to accommodate the two intake fans 51F. Each of the two intake fans 51F is positioned such that its inlet opening through which air is introduced is located on the upper side. The two intake fans 51F are arranged side by side in the front-rear direction (Y direction) within the fan storage portion 102.

As illustrated in FIG. 6, a box-shaped wireless device storage portion 202 which accommodates the wireless device 4 (see FIG. 4) and forms a part of the second channel 200 is disposed before and above the fan storage portion 102. The details of the wireless device storage portion 202 will be described later. An opening (first introduction port 101) is provided below the wireless device storage portion 202 before the fan storage portion 102. The first introduction port 101 is located inside the inlet port 232 (see FIG. 1) of the external housing 2 at a position corresponding to substantially the lower half of the inlet port 232.

The dustproof filter 26 is detachably attached to the inside the first introduction port 101.

The details of the dustproof filter 26 are now discussed.

As illustrated in FIG. 4, the dustproof filter 26 has a filter main body 261 and a filter frame 262 to prevent entrance of dust mixed with the outside air through the first introduction port 101 into the projector 1.

The filter main body 261 is a component made of material having gas permeability and preventing passage of dust, and has a rectangular parallelepiped shape so sized as to cover the first introduction port 101.

The filter frame 262 is so constructed as to hold the outer periphery of the filter main body 261. A held portion 263 (see FIG. 1) is provided at the right end (+X side) of the filter frame 262 and exposed through the external housing 2. As can be seen from FIG. 1, the held portion 263 is so shaped as to agree with the external surface of the external housing 2.

The dustproof filter 26 slides in the left-right direction while guided by guide members 61 (see FIGS. 4 and 6) of the duct 6 provided at both the left and right sides of the first introduction port 101. For replacement of the filter main body 261 of the dustproof filter 26, the held portion 263 of the dustproof filter 26 is held and pulled out from the duct 6 and the external housing 2.

The explanation is now returned to the details of the first channel 100.

The outlet portion 103 is a columnar component formed by the upper frame 6U and the lower frame 6D, and connected with the −X side surface of the fan storage portion 102 as illustrated in FIG. 6. The outlet portion 103 is so structured as to guide air delivered from the intake fans 51F toward the electro-optic device 35 and the polarization converting element 323. The outlet portion 103 is disposed below the optical unit 3 (see FIG. 2). As illustrated in FIG. 6, an opening 1031 positioned below the electro-optic device 35 (see FIG. 3) and an opening 1032 positioned below the polarization converting element 323 (see FIG. 3) are formed in the vicinity of the tip of the outlet portion 103.

Upon the drive of the intake fans 51F, the air outside the external housing 2 is introduced from the inlet port 232 via the first introduction port 101 into the inside (airflow F10 in FIG. 6). The air introduced through the first introduction port 101 flows via the dustproof filter 26 into the fan storage portion 102 to be sucked into the inlet openings of the intake fans 51F (airflow F11 in FIG. 6).

The air sucked into the inlet openings of the intake fans 51F is discharged from the outlet openings of the intake fans 51F, and flows through the outlet portion 103 (airflow F12 in FIG. 6). Then, the air is discharged from the openings 1031 and 1032 (airflows F13 and F14 in FIG. 6) to cool the electro-optic device 35 and the polarization converting element 323.

According to this structure, therefore, air is allowed to sequentially flow through the first introduction port 101, the fan storage portion 102, and the outlet portion 103 of the first channel 100 by the drive of the intake fans 51F. As a consequence, the electro-optic device 35 and the polarization converting element 323 are cooled by the air flowing along the first channel 100 (airflows F10 through F14).

Structure of Second Channel

As illustrated in FIG. 6, the second channel 200 is defined by the wireless device storage portion 202 and the lens channel 203 of the duct 6.

As illustrated in FIG. 6, the wireless device storage portion 202 is disposed above the first introduction port 101 and the dustproof filter 26. The wireless device storage portion 202 is produced by a portion formed on the upper frame 6U and opened to above, and the cover 6C closing this opening.

As explained above, the wireless device storage portion 202 accommodates the wireless device 4 such that the wireless device 4 is inclined to the X-Z plane with the ribs of the heat sink 44 extending in the up-down direction (see FIG. 4). As illustrated in FIG. 6, a plurality of openings (second introduction ports 201) are provided on the front surface of the wireless device storage portion 202 above the first introduction port 101. The plural second introduction ports 201 are disposed inside the inlet port 232 (see FIG. 1) of the external housing 2 along the vicinity of the upper edge of the first introduction port 101. The wireless device 4 accommodated in the wireless device storage portion 202 is located closer to the inlet port 232 with respect to the projection lens 36 and in the vicinity of the inlet port 232. The wireless device 4 is positioned such that the receiver 42 faces to the light projection side from the projection lens 36.

The second introduction ports 201 are so sized as to prevent contact between a human finger inserted from the outside of the projector 1 and the wireless device 4 accommodated in the wireless device storage portion 202 so as to increase safety. As illustrated in FIG. 6, a band-shaped projection 62 corresponding to the inner peripheral edge of the inlet port 232 is provided around the first introduction port 101 and the second introduction ports 201. A cushion member (not shown) is further provided outside the projection 62 so as to prevent entrance of dust through the clearance between the external housing 2 and the duct 6 into the first channel 100.

As illustrated in FIG. 6, the lens channel 203 is detachably connected to the −X side surface of the wireless device storage portion 202 such that the air having flowed through the wireless device storage portion 202 can flow within the lens channel 203. As illustrated in FIG. 2, the lens channel 203 is provided in such a manner as to ride on the projection lens 36. More specifically, the lens channel 203 is positioned behind the zoom ring 363 and above the projection lens 36. The tip of the lens channel 203 is inserted into the outlet unit 52.

Airflow along the second channel 200 is produced by the drive of the exhaust fan 52F.

Upon the drive of the exhaust fan 52F, the air outside the external housing 2 is introduced from the inlet port 232 into the external housing 2 via the second introduction ports 201 (airflow F20 in FIG. 6). The air introduced through the second introduction ports 201 is supplied toward the wireless device 4 accommodated in the wireless device storage portion 202. Then, the supplied air flows along the ribs of the heat sink 44 extending in the up-down direction to cool the wireless device 4 (airflow F21 in FIG. 6).

The air having cooled the wireless device 4 flows along the lens channel 203 (airflow F22 in FIG. 6) to be discharged from the tip of the lens channel 203 toward the outlet unit 52 (see FIG. 2) as airflow F23 in FIG. 6.

According to this structure, therefore, air is allowed to sequentially flow through the second introduction ports 201, the wireless device storage portion 202, and the lens channel 203 of the second channel 200 by the drive of the exhaust fan 52F. As a consequence, the wireless device 4 is cooled by the air flowing along the second channel 200 (airflows F20 through F23).

Accordingly, by the structure of the duct 6 discussed herein, the outside air introduced from the common inlet port 232 is branched into two channels (first channel 100 and second channel 200), and supplied toward the electro-optic device 35 and the polarization converting element 323, and also toward the wireless device 4 by the drive of the intake fans 51F and the exhaust fan 52F.

Structure of Outlet Unit

The details of the outlet unit 52 are next explained.

The outlet unit 52 is disposed between the light source device 31 and the outlet port 233.

Figure 7A:
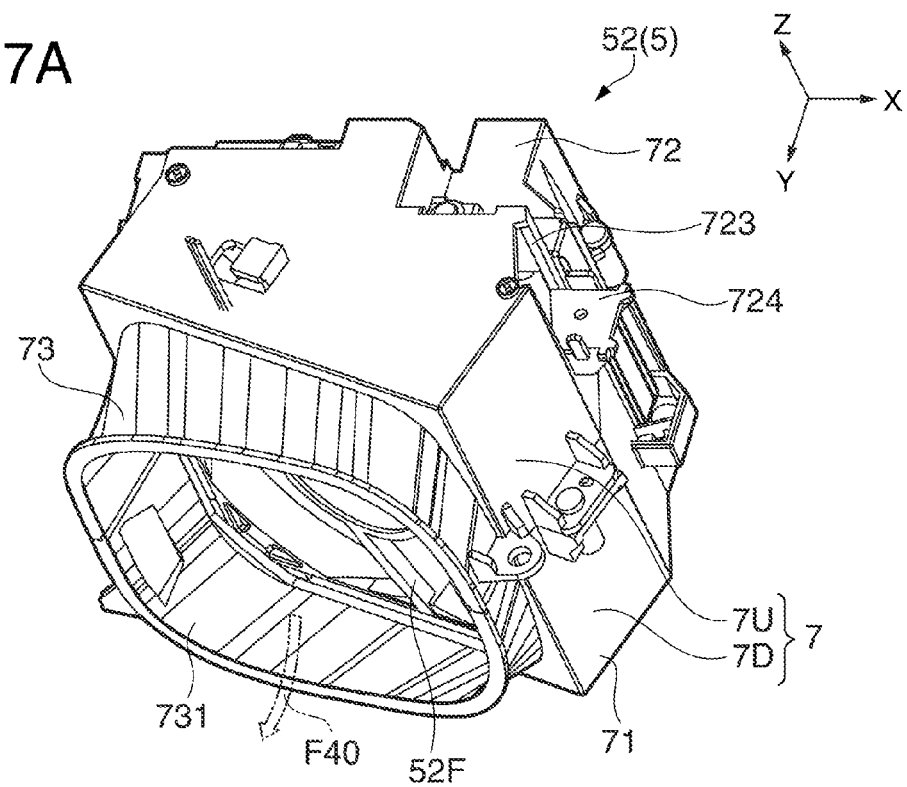
FIGS. 7A and 7B are perspective views of an outlet unit according to the embodiment.
Figure 7B:
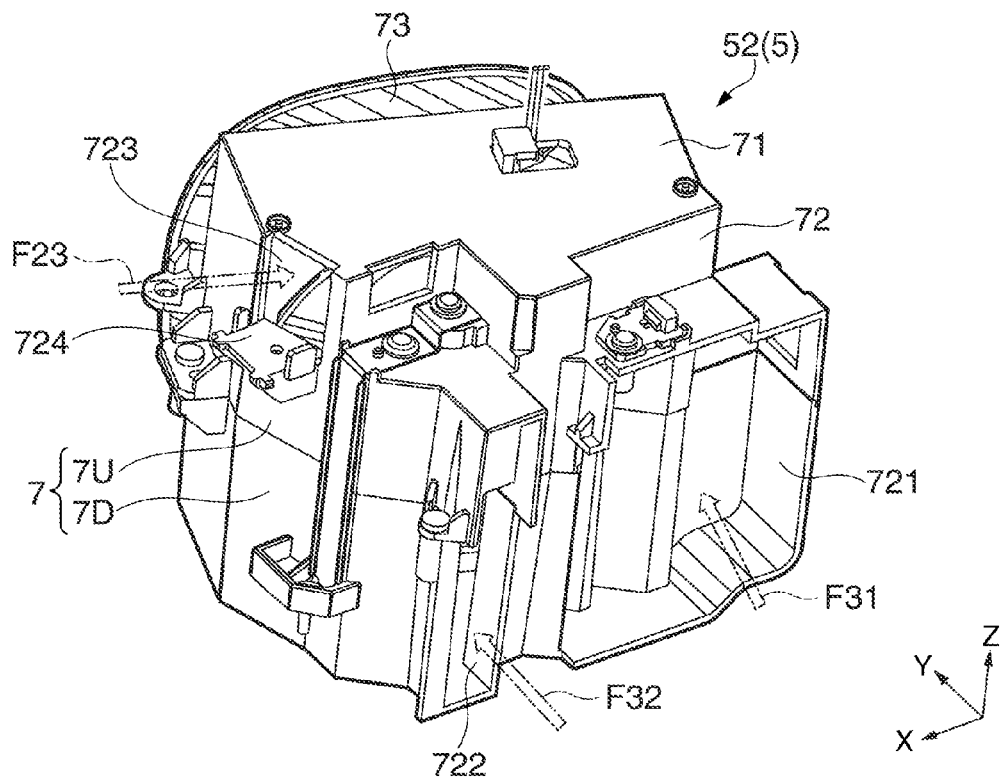

FIGS. 7A and 7B are perspective views of the outlet unit 52. FIG. 7A illustrates the outlet unit 52 as diagonally viewed from the front, while FIG. 7B illustrates the outlet unit 52 as diagonally viewed from the rear.

As illustrated in FIGS. 7A and 7B, the outlet unit 52 has an exhaust duct 7 as well as the exhaust fan 52F.

The exhaust fan 52F is constituted by an axial fan.

As illustrated in FIGS. 7A and 7B, the exhaust duct 7 is constituted by an upper frame 7U forming the upper part, and a lower frame 7D forming the lower part. The exhaust duct 7, under the condition in which the upper frame 7U and the lower frame 7D are combined, holds the outer periphery of the exhaust fan 52F and guides the air introduced into the exhaust fan 52F and discharged from the exhaust fan 52F.

As illustrated in FIGS. 7A and 7B, the exhaust duct 7 has a holding portion 71 holding the exhaust fan 52F, an inlet portion 72 disposed on the −Y side of the holding portion 71 (the side where air is introduced toward the exhaust fan 52F), and an outlet portion 73 disposed on the +Y side of the holding portion 71 (the side where air is discharged from the exhaust fan 52F).

The inlet portion 72 extends toward the vicinity of the optical unit 3 as illustrated in FIG. 2, and has openings 721, 722, and 723 as illustrated in FIG. 7B.

The opening 721 having a rectangular shape in the plan view is formed at a position corresponding to the light source device 31. The opening 722 disposed on the +X side of the opening 721 has a rectangular shape in the plan view which extends in the up-down direction corresponding to the direction of the length of the rectangular shape.

Upon the drive of the exhaust fan 52F, air and the like heated after cooling the light source device 31 flows into the opening 721 (airflow F31 in FIG. 7B). On the other hand, air heated after cooling the electro-optic device 35, the polarization converting element 323, the power source device and others flows into the opening 722 (airflow F32 in FIG. 7B).

As illustrated in FIGS. 7A and 7B, the opening 723 is disposed on the +X side of the inlet portion 72. A plate-shaped projection 724 is provided on the lower edge of the opening 723. The tip of the lens channel 203 of the duct 6 is disposed on the upper surface of the projection 724 such that the opening 723 communicates with the lens channel 203 as illustrated in FIG. 2. According to this structure, the air discharged from the tip of the lens channel 203 (airflow F23 in FIG. 6) flows through the opening 723 into the exhaust fan 52F. In other words, the second channel 200 is so constructed as to guide the air introduced through the inlet port 232 via the wireless device 4 toward the exhaust fan 52F.

The outlet portion 73 has a columnar shape which has an opening 731 formed in correspondence with the outlet port 233. By the drive of the exhaust fan 52F, air introduced through the openings 721, 722, and 723 passes through the opening 731 and the outlet port 233, and flows out of the external housing 2 (airflow F40 in FIG. 7A).

According to this structure, therefore, the outlet unit 52 collectively discharges the air introduced through the inlet port 232 and flowing into the external housing 2 via the first channel 100 and the second channel 200, that is, the air heated after cooling the electro-optic device 35, the polarization converting element 323 and others, and the air heated after cooling the wireless device 4. Furthermore, the air heated after cooling the light source device 31 is discharged from the outlet port 233 without passing through the second channel 200.

According to the projector 1 in this embodiment, the following advantages can be offered.

(1) The air flowing along the first channel 100 and the air flowing along the second channel 200 do not interfere with each other. In this case, control over the flow amount and the flow speed of the air supplied toward the first channel 100 and the second channel 200 for cooling the electro-optic device 35, the polarization converting element 323, and the wireless device 4, that is, control over the driving of the intake fans 51F, the exhaust fan 52F and others becomes easier, contributing to efficient cooling for the electro-optic device 35, the polarization converting element 323, and the wireless device 4. Accordingly, deterioration of the quality of the image to be projected caused by a high temperature, deterioration of communicational performance of the wireless device 4, and deterioration of the peripheral components around the electro-optic device 35 and the wireless device 4 can be reduced.

The efficient cooling thus achieved further allows reduction of the sizes of the intake fans 51F and the exhaust fan 52F and therefore the entire size of the projector 1, and also allows the use of the intake fans 51F and the exhaust fan 52F capable of supplying larger amounts of air so as to reduce noise generated from the projector 1.

(2) The inlet port 232 and the outlet port 233 are formed in the external housing 2 on the side where light is projected from the projection lens 36. In other words, the projector 1 introduces air for cooling the electro-optic device 35, the polarization converting element 323, and the wireless device 4 from the front (image projection side) and discharges the air toward the front. According to this structure, the projector 1 can securely cool the electro-optic device 35, the polarization converting element 323, and the wireless device 4 without closure of the inlet port 232 and the outlet port 233 even in such an installation environment where parts and the like are disposed in the vicinity of the left or right side or the rear side of the projector 1. Moreover, the air discharged from the outlet port 233 does not reach an observer observing the image in the vicinity of the left or right side or the rear side of the projector 1. Thus, the observer is not made uncomfortable by the discharged air during image projection.

Accordingly, the projector 1 in this embodiment can achieve both reduction of deterioration of the electro-optic device 35, the polarization converting element 323, and the wireless device 4, and increase in the degree of freedom for the way of installation of the projector 1 and the position of the observer observing the image.

(3) The wireless device 4 is disposed in the vicinity of the inlet port 232. In this arrangement, the wireless device 4 can be more efficiently cooled by cooling air introduced through the inlet port 232 and supplied before cooling other components.

The lens channel 203 constituting a part of the second channel 200 is provided in such a manner as to ride on the projection lens 36. In this case, the space around the projection lens 36 as a dead space is effectively utilized to produce the second channel 200 which is the channel connected with the exhaust fan 52F close to the outlet port 233. Accordingly, formation of the efficient cooling structure and size reduction of the projector 1 can be both achieved.

(4) The wireless device 4 and the light source 311 are disposed away from each other such that the air having cooled the light source 311 can be discharged from the outlet port 233 without passing through the second channel 200. In this case, heat generated from the light source 311 is not easily conducted to the wireless device 4, in which condition more effective cooling for the wireless device 4 can be achieved.

(5) The wireless device 4 is disposed such that the receiver 42 faces to the side of light projection from the projection lens 36. In this arrangement, the receiver 42 of the wireless device 4 is disposed opposed to the projected image, that is, the projection surface such as a screen. Accordingly, the wireless device 4 can securely communicate with an external transmitting device when this external transmitting device is positioned in the vicinity of the screen for communicating with the wireless device 4, that is, installed in such a condition that obstacles to the wireless communication can be decreased under the use environment of the projector 1.

(6) The inlet port 232 is provided at only the one position as a port through which air is introduced to flow within the external housing 2 while branched into the first channel 100 and the second channel 200. According to this structure, the necessity for forming the inlet port 232 separately for each of the first channel 100 and the second channel 200 is eliminated. Thus, the number of openings formed in the external housing 2 decreases, which improves the design of the projector 1.

(7) The exhaust fan 52F collectively discharges the air heated after cooling the electro-optic device 35 and the polarization converting element 323, and the air heated after cooling the wireless device 4 through the outlet port 233. In this case, only the one opening of the outlet port 233 is required to be formed. Thus, further size reduction and design improvement of the projector 1 can be achieved than a structure which separately forms an outlet port for each of the first channel 100 and the second channel 200.

(8) The lens channel 203 is detachably attached to the wireless device storage portion 202. In this case, the optical unit 3 and the projection lens 36 can be detached from the lower case 22 by removal of the lens channel 203 while the cooling device 5 is being attached to the lower case 22. Accordingly, replacement of the respective components becomes easier, and therefore the working efficiency during manufacturing steps and after services improves.

(9) The dustproof filter 26 is provided inside the first introduction port 101. In this case, entrance of dust into the part of the first channel 100 after the dustproof filter 26 can be avoided. Accordingly, dust mixed with the air introduced through the inlet port 232 does not adhere to the electro-optic device 35, in which condition a high quality of the projected image is allowed to be maintained.

Modified Example

This embodiment can be modified in the following manners.

According to this embodiment, the wireless device 4 is positioned above the first introduction port 101. However, the positions of the wireless device 4 and the first introduction port 101 may be switched in the up-down direction such that the wireless device 4 is positioned below the first introduction port 101.

In the case of the structure which locates the wireless device 4 below the first introduction port 101, the second introduction ports 201 may be formed in the bottom of the wireless device storage portion 202, in which arrangement the inlet port 232 communicating with the second introduction ports 201 may be formed in the bottom or other positions of the external housing 2.

According to this embodiment, the first introduction port 101 and the second introduction ports 201 are disposed side by side in the up-down direction. However, the first introduction port 101 and the second introduction ports 201 may be positioned side by side in the left-right direction.

While the wireless device 4 in this embodiment is so constructed as to provide WiHD system high-speed wireless communication, the wireless device 4 may be a device which receives a wireless signal for other types of wireless communication such as wireless LAN (local area network) communication. Alternatively, the wireless device 4 may be a device which transmits a signal to an external device by wireless.

While the wireless device 4 is provided as the second controller in this embodiment, other devices may be equipped as the second controller in place of the wireless device 4 as long as they perform a predetermined function separately from the first controller and increase their temperatures during use.

According to this embodiment, the first channel 100 and the second channel 200 are produced by the duct 6. However, the first channel 100 and the second channel 200 may be formed by the combination of a duct constituting at least a part of the first channel 100 and the second channel 200 and accommodated within the external housing 2, and a part other than this duct such as a part of the external housing 2.

According to this embodiment, air introduced through the common inlet port 232 flows along the first channel 100 and the second channel 200. However, the inlet port may be separately provided for each of the first channel 100 and the second channel 200.

According to this embodiment, the second channel 200 is so structured that the air introduced through the inlet port 232 can be guided via the wireless device 4 toward the exhaust fan 52F. However, air introduced not through the inlet port 232 but through another air introduction port formed within the external housing 2 may be guided via the wireless device 4 toward the exhaust fan 52F.

While the transmission type liquid crystal light valves 351 are included in the projector 1 as the light modulation devices in this embodiment, reflection type liquid crystal light valves may be equipped as the light modulation devices.

The light source 311 is not limited to the discharge-type lamp but may be other types of lamp or a solid light source such as a light emitting diode.

The entire disclosure of Japanese Patent Application No. 2011-085174, filed Apr. 7, 2011 and No. 2011-266541, filed Dec. 6, 2011 are expressly incorporated by reference herein.

What is claimed is:

1. A projector comprising:
   a light modulation device which modulates light emitted from a light source according to image information;
   a projection lens which projects the light modulated by the light modulation device;
   a first controller equipped to drive the light modulation device;
   a second controller provided separately from the first controller to perform a predetermined function;
   an external housing which accommodates the light modulation device, the first controller, and the second controller;

a first fan which introduces air outside the external housing into the external housing through an inlet port;

a second fan which discharges the air introduced into the external housing through the inlet port to the outside through an outlet port;

a first channel which guides the air introduced through the inlet port toward the light modulation device by the drive of the first fan; and a second channel which guides the air introduced into the external housing toward the second fan via the second controller by the drive of the second fan;

wherein the external housing has an opening through which light passes from the projection lens;

the inlet port and the outlet port are disposed on the same side as the opening of the external housing;

the opening is interposed between the inlet port and the outlet port;

the second controller is disposed within the external housing near the inlet port and away from the outlet port with the projection lens interposed between the inlet port and the outlet port; and the second channel is provided in such a manner as to ride on the projection lens.

2. The projector according to claim 1, wherein the light source is disposed within the external housing near the outlet port with respect to the position of the projection lens.

3. The projector according to claim 1, wherein at least a part of the first channel and the second channel is formed by a duct accommodated in the external housing.

4. The projector according to claim 1, wherein the second controller is a wireless device which can provide wireless communication; and a receiver or a transmitter of the wireless device faces to the light projection side from the projection lens.

* * * * *